United States Patent [19]

Rorer et al.

[11] 4,419,815
[45] Dec. 13, 1983

[54] METHOD OF MAKING AN AIRCRAFT BATTERY

[75] Inventors: David L. Rorer; Jasper E. Hardin, both of Redlands, Calif.

[73] Assignee: Teledyne Industries, Inc., Los Angeles, Calif.

[21] Appl. No.: 333,041

[22] Filed: Dec. 21, 1981

Related U.S. Application Data

[62] Division of Ser. No. 236,670, Feb. 23, 1980, Pat. No. 4,337,301.

[51] Int. Cl.$^3$ ............................................. H01M 2/06
[52] U.S. Cl. .................................................. 29/623.2
[58] Field of Search .................... 29/623.1, 623.2, 730; 339/224, 232, 263 B; 429/178, 179, 181, 184, 185

[56] References Cited

U.S. PATENT DOCUMENTS 4,191,807  3/1980  Karpal ................................ 429/185
4,239,841  12/1980  Rorer ................................. 429/179

Primary Examiner—Lowell A. Larson
Assistant Examiner—Jonathan L. Scherer
Attorney, Agent, or Firm—Reagin & King

[57] ABSTRACT

A lead-acid battery having a unique arrangement for making electrical connection to the battery. The arrangement includes L-shaped lugs molded into the upper surface of the casing. The lugs have cylindrical apertures extending horizontally therethrough for mating with the connector posts of the battery plates. Threaded pin terminals insert through a receptacle which is slidably mounted with a slot in a side wall of the battery. The pin terminals are threaded into nuts which are cast within the L-shaped lugs.

1 Claim, 5 Drawing Figures

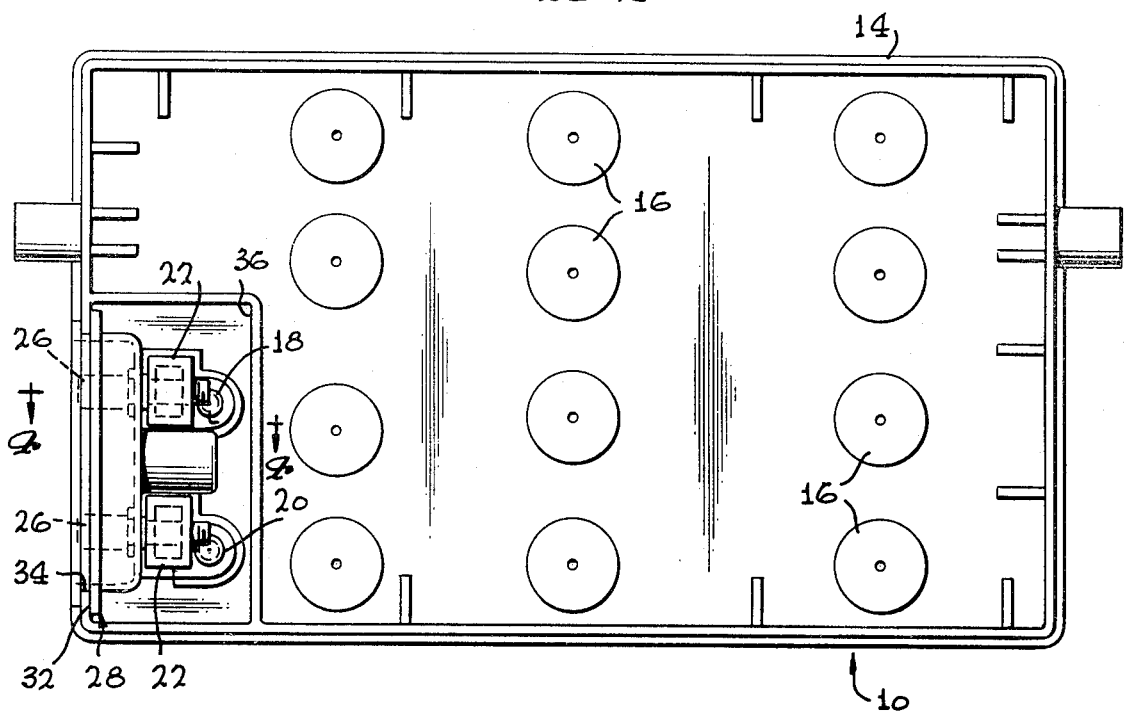
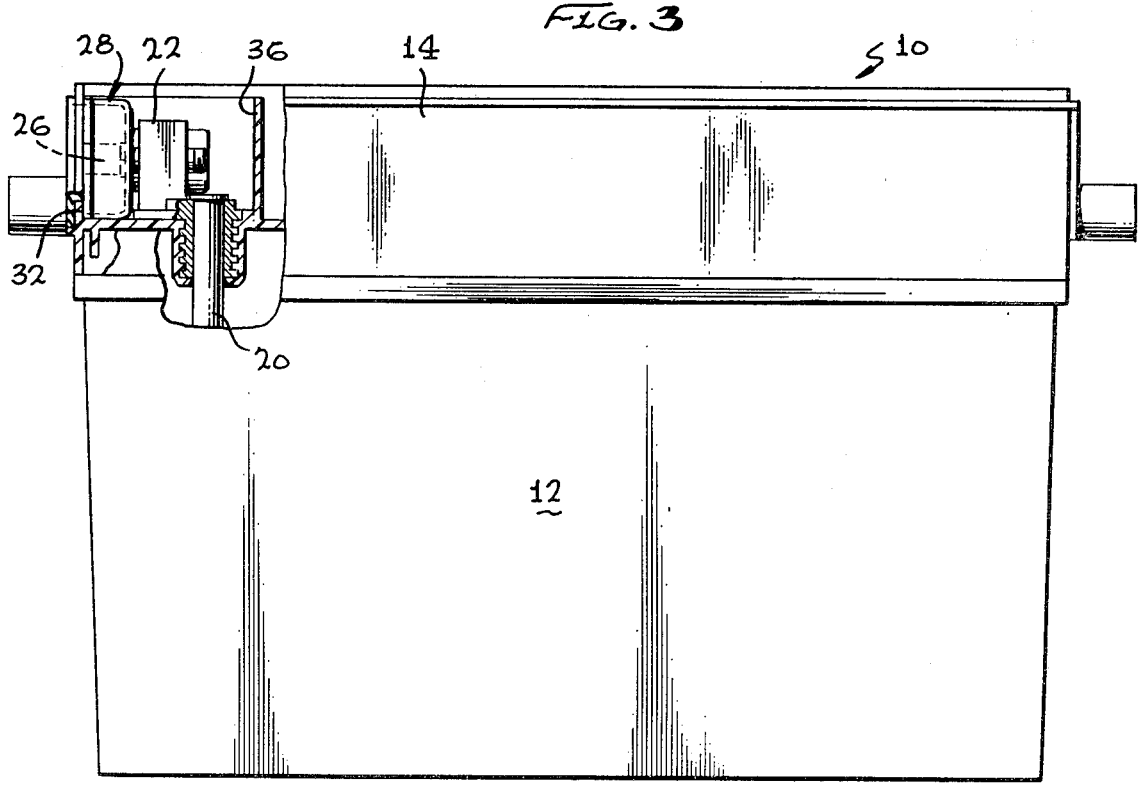

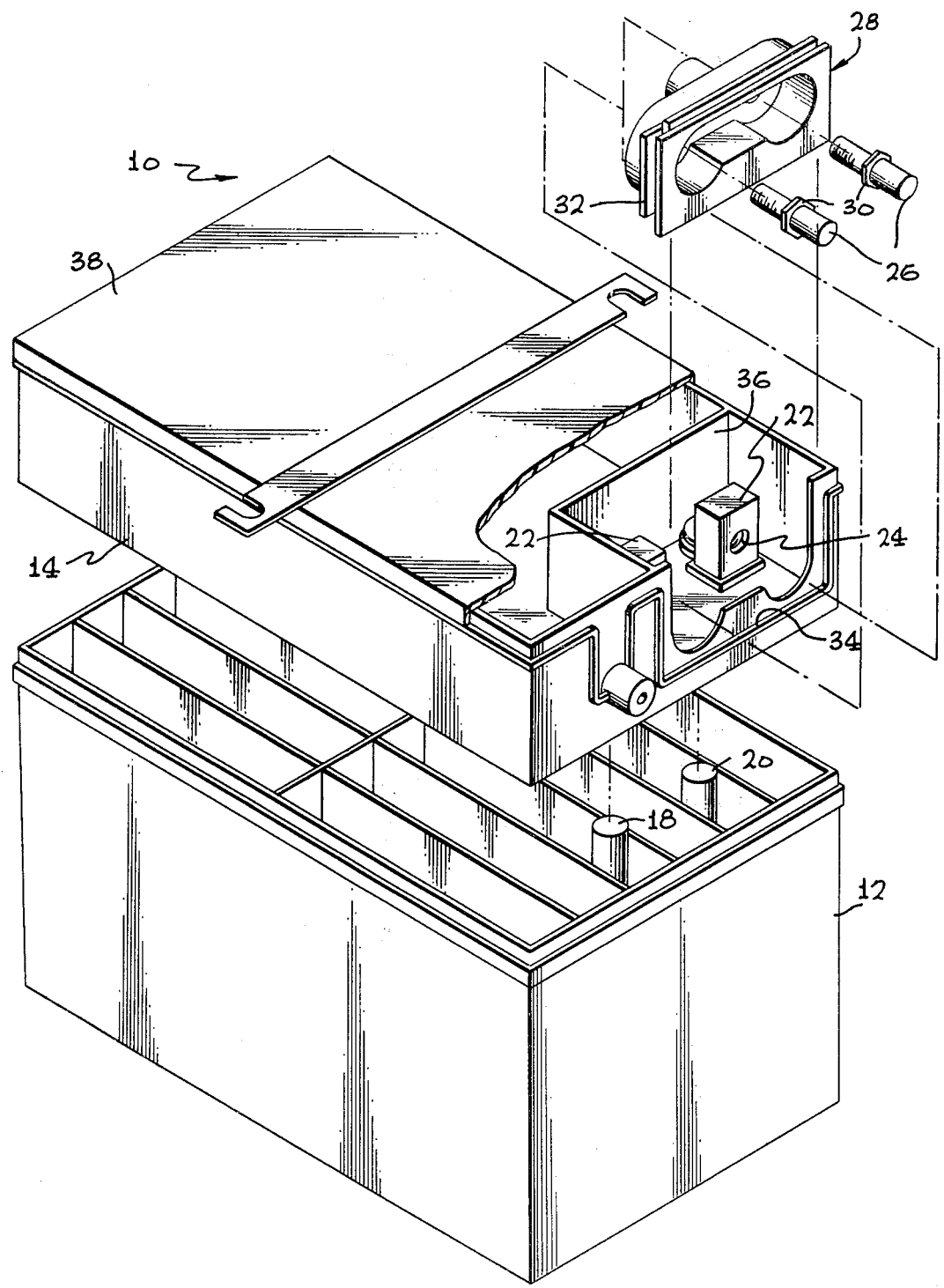

4,419,815

METHOD OF MAKING AN AIRCRAFT BATTERY

This application is a division, of application Ser. No. 236,670, filed Feb. 23, 1980, now U.S. Pat. No. 4,337,301.

This invention relates to batteries and, more particularly, to lead-acid aircraft batteries.

There have been many lead-acid aircraft batteries devised. In general, such batteries comprise a casing containing interleaved lead and lead oxide plates (hereinafter referred to as "lead" plates) in an acid electrolyte. The casing may be manufactured of a plastic material and may be supported within an aluminum exterior housing which protects against electrical interference. The lead plates are interconnected and are terminated in connection posts. In many of the more modern batteries, external terminals are provided in a receptacle which is mounted to the side of the housing so that the terminals extend horizontally therefrom. The receptacle is fastened to the housing by using a multitude of bolts and nuts. The external terminals are fastened to the connection posts in a manner which requires a plurality of washers, nuts and terminal lugs. Although such an arrangement functions quite satisfactorily in use, the large number of hardware components required for assembly complicates the assembly process and increases the cost of such aircraft batteries.

It is an object of the present invention to provide a new and improved lead-acid aircraft battery.

It is another object of the present invention to provide an improved aircraft battery which requires fewer components and which is significantly less expensive to manufacture.

SUMMARY OF THE INVENTION

The foregoing and other objects of the invention are accomplished by a lead-acid aircraft battery having a unique arrangement for making electrical connections to the battery. Connector posts lead from the lead plates within the battery to the upper surface of the casing. A plastic casing cover is also provided which mates with the casing. Integrally molded within the casing cover are unique L-shaped lugs. The lugs have cylindrical apertures extending vertically therethrough which are designed to mate with the connector posts. A threaded nut is cast within the vertical portion of the L-shaped lug. A receptacle having a grooved outer surface is slidably mounted into a slot provided in a side wall of the casing cover.

Threaded external terminals are inserted through apertures provided in the receptacle and are bolted to the threaded nuts cast with the L-shaped lugs. The exterior terminals have axially aligned surfaces which are adapted to receive a tightening tool and which bear against the exterior of the receptacle. This arrangement totally eliminates the need for any additional hardware to fasten the receptacle or the external terminals. Twenty-five fewer components are needed to assemble the battery of the present invention as compared to prior art batteries.

Other objects, features, and advantages of the invention will become apparent from a reading of the specification taken in conjunction with the drawings in which like reference numerals refer to like elements in the several views.

BRIEF DESCRIPTION OF THE DRAWINGS

FIG. 3 is a side view, partially cut away, of the battery shown in FIG. 1;

FIG. 4 is a cross sectional view of the battery terminal assembly taken along the line 4—4 of FIG. 2; and FIG. 5 is an exploded perspective view of the battery shown in FIG. 1 disclosing the details of assembly thereof.

DESCRIPTION OF THE PREFERRED EMBODIMENT

Figure 1:
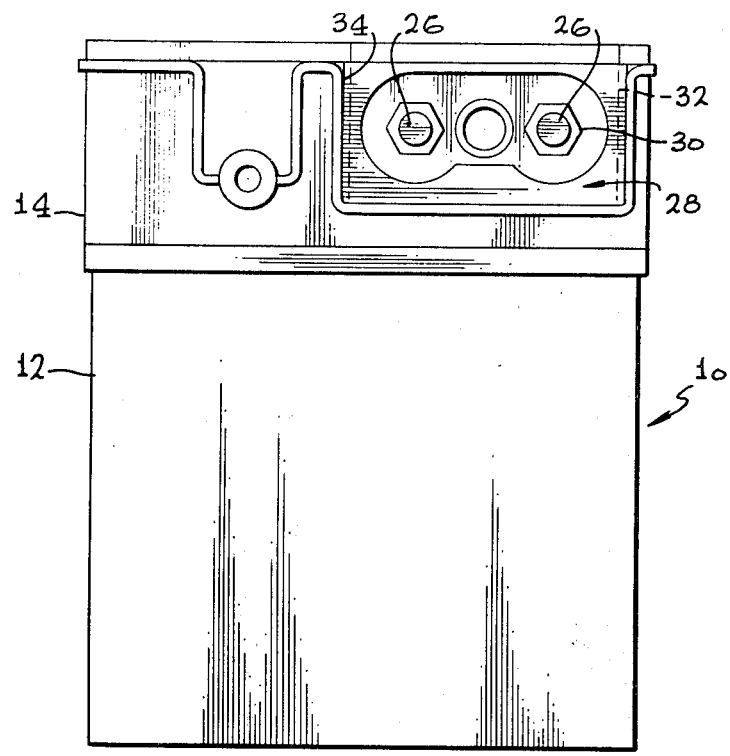
FIG. 1 is a front view of a lead-acid aircraft battery constructed in accordance with the invention.
Figure 2:
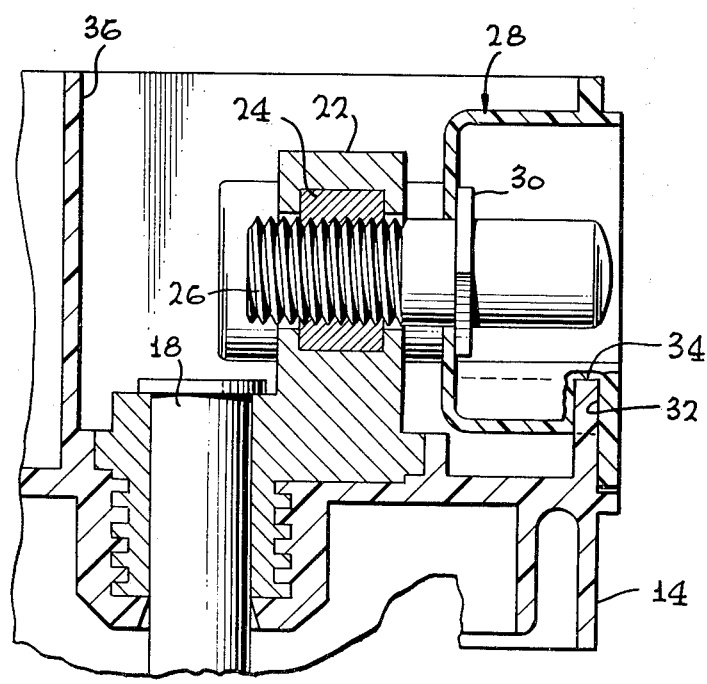
FIG. 2 is a top view, partially cut away, of the battery shown in FIG. 1.

Referring now to the drawings and, more particularly, to FIGS. 1, 2, and 3, there is shown a lead-acid aircraft battery 10 constructed in accordance with this invention. The battery 10 comprises a molded casing 12 (often constructed of polyethylene) which has a number of separate cavities in which are placed the lead plates and the electrolyte material, not shown. The interior of the battery may be better understood by viewing FIG. 5. The casing 12 supports a cover 14 which may also be constructed of a moldable plastic material and has a number of vent plugs 16 (constructed in a well known manner) projecting therefrom. The vent plugs 16 are utilized to release gas pressure buildup within the battery 10 during operation. The lead plates are separated and are interconnected as is well known and ultimately terminate in negative and positive connector posts 18 and 20 which project through the cover 14. Each of the connector posts 18 and 20 may be formed of lead and is permanently connected to an L-shaped lug 22 molded within the cover 14 as described below.

Referring to FIG. 4, there is shown a cross sectional view of the battery terminal assembly, illustrating the configuration of the L-shaped lug 22. As shown in FIG. 4 the lug 22, which may be formed of lead, is molded into the cover 14. Cast within the lug 22 is a threaded nut 24 which may be typically formed of stainless steel. The lugs 22 have apertures with vertical axes extending therethrough through which project the connector posts 18 and 20.

The nut 24 within each lug 22 is positioned to engage the threaded end of a terminal pin 26. Each pin 26 projects horizontally from the exterior of the battery 10 and proceeds through a circular aperture in a receptacle 28. Each metallic pin 26 has a hex-shaped surface 30 adapted to mate with a wrench so that it may be rotated. As shown in FIG. 4, the threaded end of each pin 26 extends through the receptacle 28 and is threaded into the nut 24 within the lug 22.

As may be seen from the Figures, the receptacle 28 (which may be constructed of a plastic such as polypropylene) includes a groove 32 along the outer edge. The receptacle 28 is secured to the cover 14 by slidably inserting the receptacle 28 into an aperture 34 in the side of the cover 14. The groove 32 in the receptacle 28 engages the side wall of the cover 14 to retain the receptacle 28 in position.

As may be seen in FIG. 5, the battery is assembled in the following manner. The casing 12 receives the lead plates (not shown) which are interconnected in a well known manner. Next, the internal conductors and connector posts 18 and 20 are connected. The cover 14, with the lugs 22 molded in place, is then mounted onto the casing 12. The connecting posts 18 and 20 project through the vertically aligned apertures in the lugs 22. The posts 18 and 20 are permanently connected to the lugs 22 by heating the lead posts 18 and 20 so that they melt and fuse with the lead lugs 22. The cover 14 is sealed to the casing 12 by use of an adhesive such as an epoxy resin.

The receptacle 28 is then slid into place within the aperture 34 in the side of the cover 14. The groove 32 along the outer edge of the receptacle 28 engages the side wall of the cover 14 along the perimeter of the aperture 34, retaining the receptacle 28. The pins 26 are inserted through apertures in the receptacle 28 and are threaded into the nuts 24 cast within the lugs 22. Once in place, the pins 26 are tightened into the nuts 24 to the appropriate tightness, usually by a power wrench. This method of assembly allows a substantial amount of time to be saved in the assembly of the battery. This arrangement is to be contrasted with prior art arrangements in which the external terminals and receptacle required as many as twenty-five additional hardware components to bolt the receptacle to the casing and to bolt the external terminals to the lugs. Once the receptacle 28 with pins 26 has been assembled and tightened as explained, the entire area between the rear surface of the receptacle 28 and a barrier wall 36 within the cover 14 is covered with a liquid resin for protective purposes. This resin also acts to seal the receptacle 28 to the cover 14. Finally, an aluminum cover 38 is placed over the cover 14.

As will be understood, the battery 10 is then ready for use. External connections to the terminals 26 are normally made by a socket containing female receptacles for connection to the terminals 26.

Although a preferred embodiment has been shown and described, various other embodiments and configurations will be obvious to those skilled in the art without departing from the spirit and scope of the invention. For example, the battery configuration of the present invention may be used to construct batteries which employ metallic exterior housings as well as plastic housings. It is thus the intention of the inventors to be limited only by the scope of the claims appended hereto.

What is claimed is:

1. A method of making an aircraft battery comprising the steps of:
   installing and interconnecting battery plates within a casing;
   attaching a pair of connector posts to the plates so that the posts project above the top surface of the casing;
   providing a cover having a pair of lugs molded therein, each lug including an aperture extending vertically therethrough and a threaded nut cast within the lug so that its axis is horizontally disposed, the cover also including a slot in the wall of the cover, the slot having three sides and an opening at the top edge of the cover;
   fastening the cover to the top of the casing so that the posts extend through the apertures in the lugs;
   affixing the posts to the lugs;
   sealing the cover to the casing;
   providing a receptacle having a groove along its outer edge and two apertures extending horizontally therethrough;
   sliding the receptacle into the slot in the wall of the cover so that the receptacle groove engages the sides of the slot;
   providing a pair of terminal pins each having a threaded end and having a surface thereon adapted to receive a wrench for rotating it about its axis;
   inserting the threaded ends of the pins through the apertures in the receptacle;
   threading the threaded ends of the pins into the nuts cast within the lugs; and tightening the pins by means of a wrench bearing on the surface of the pin adapted to receive the wrench.

* * * * *